Feb. 23, 1943. H. F. ELLIOTT 2,311,649
PRESELECTOR APPARATUS
Filed May 5, 1941 8 Sheets-Sheet 1

Inventor:
Harold F. Elliott

Feb. 23, 1943. H. F. ELLIOTT 2,311,649
PRESELECTOR APPARATUS
Filed May 5, 1941 8 Sheets-Sheet 3

Inventor:
Harold F. Elliott.
By Foorman L. Mueller
Att'y.

Feb. 23, 1943. H. F. ELLIOTT 2,311,649
PRESELECTOR APPARATUS
Filed May 5, 1941 8 Sheets-Sheet 4
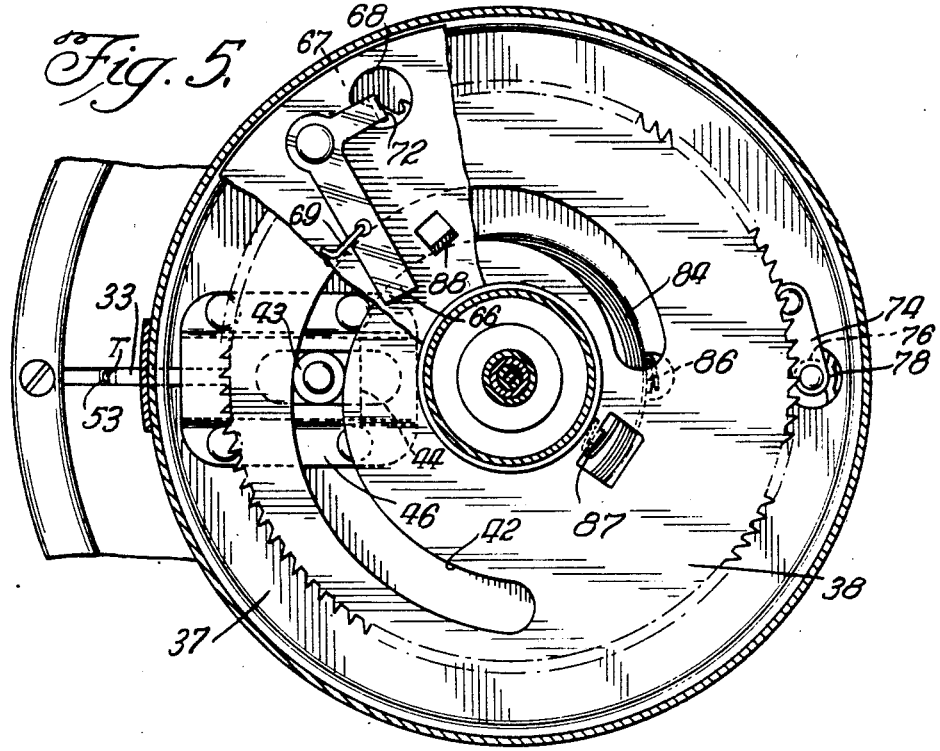
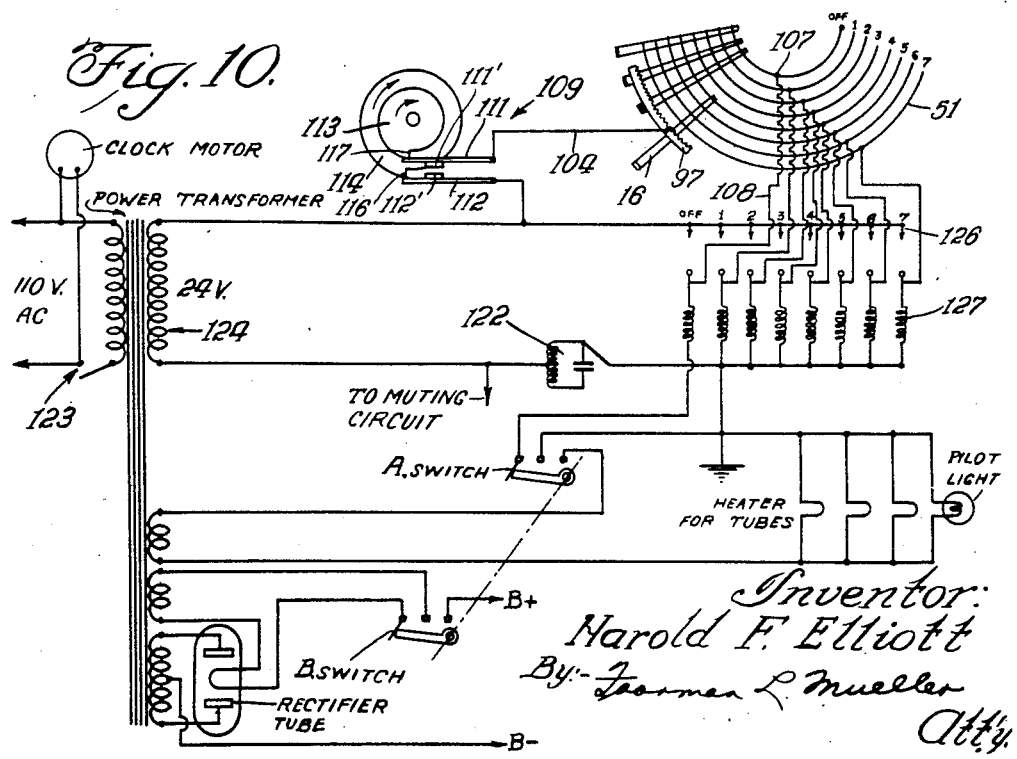
Inventor:
Harold F. Elliott
By- Foorman L. Mueller
Atty.

Feb. 23, 1943.   H. F. ELLIOTT   2,311,649
PRESELECTOR APPARATUS
Filed May 5, 1941   8 Sheets-Sheet 5
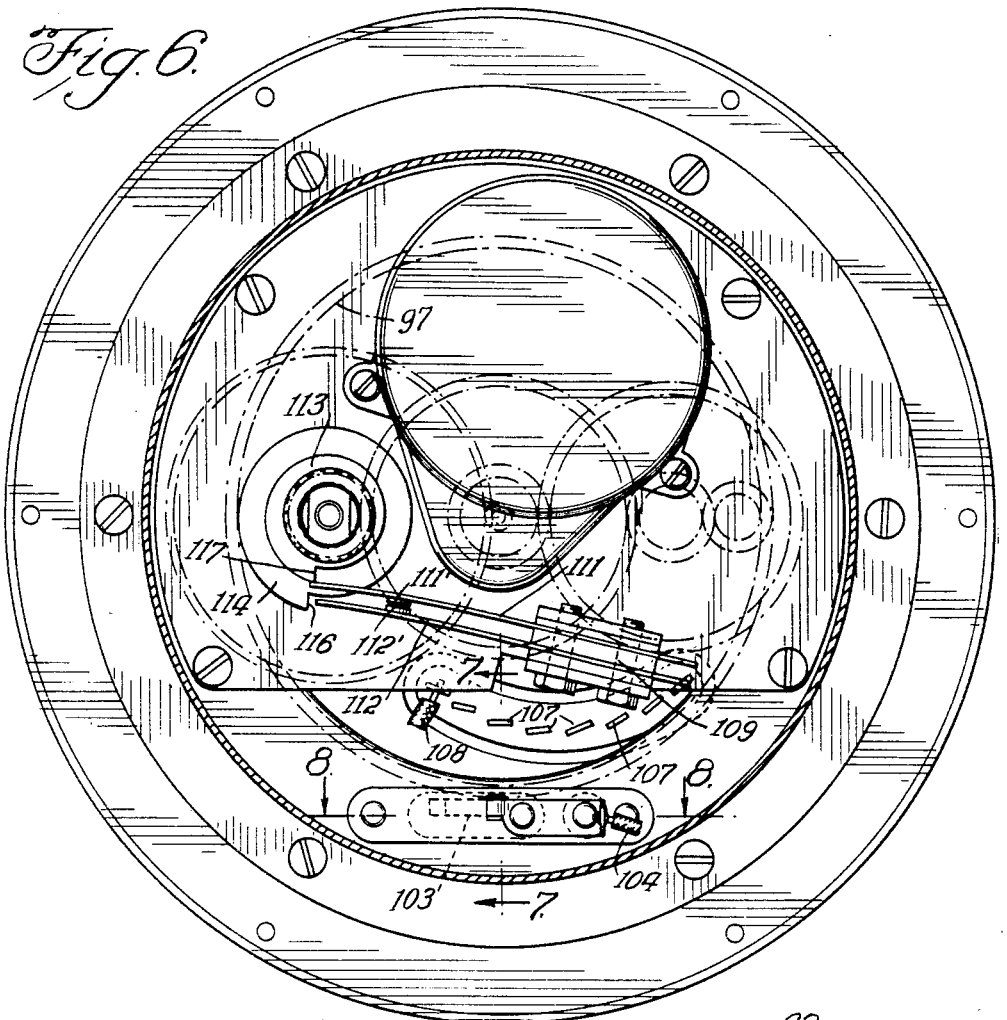
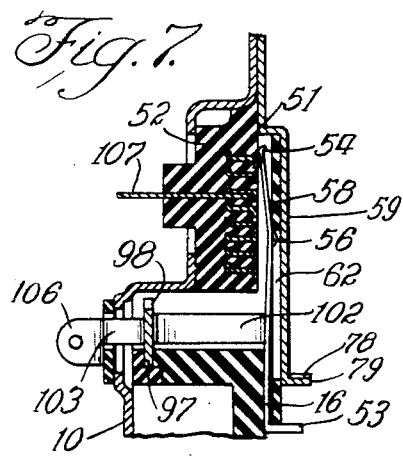
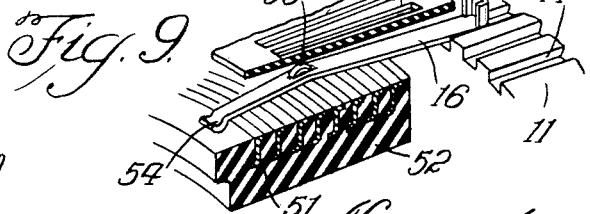
Inventor:
Harold F. Elliott
By Norman L. Mueller
Atty.

Feb. 23, 1943. H. F. ELLIOTT 2,311,649
PRESELECTOR APPARATUS
Filed May 5, 1941 8 Sheets-Sheet 6
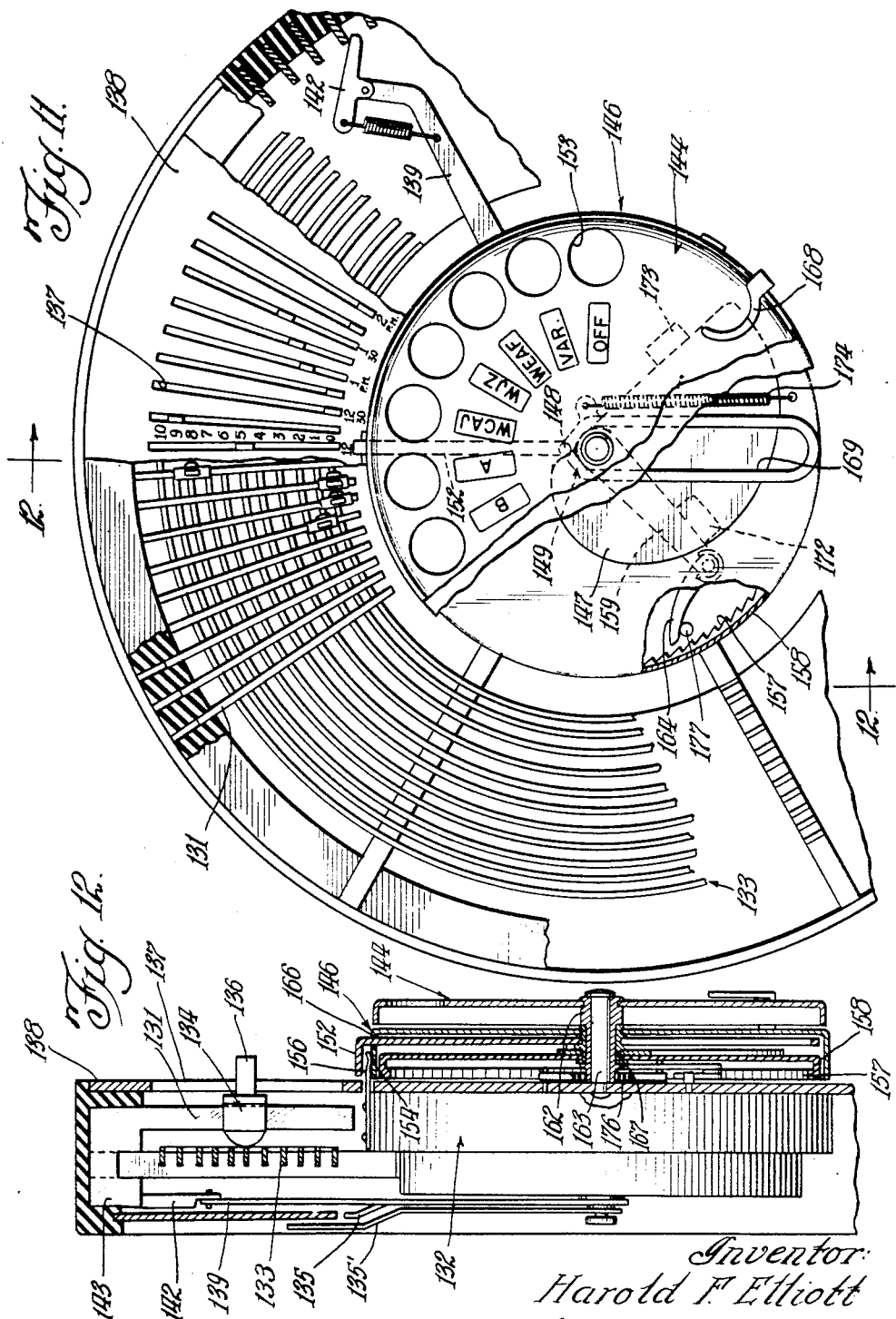
Inventor
Harold F. Elliott
By Foorman L. Mueller
Atty.

Feb. 23, 1943.                H. F. ELLIOTT                2,311,649
                          PRESELECTOR APPARATUS
                          Filed May 5, 1941            8 Sheets-Sheet 7

Inventor:
Harold F. Elliott
By: Foorman L. Mueller
Atty.

Feb. 23, 1943. H. F. ELLIOTT 2,311,649
PRESELECTOR APPARATUS
Filed May 5, 1941 8 Sheets-Sheet 8
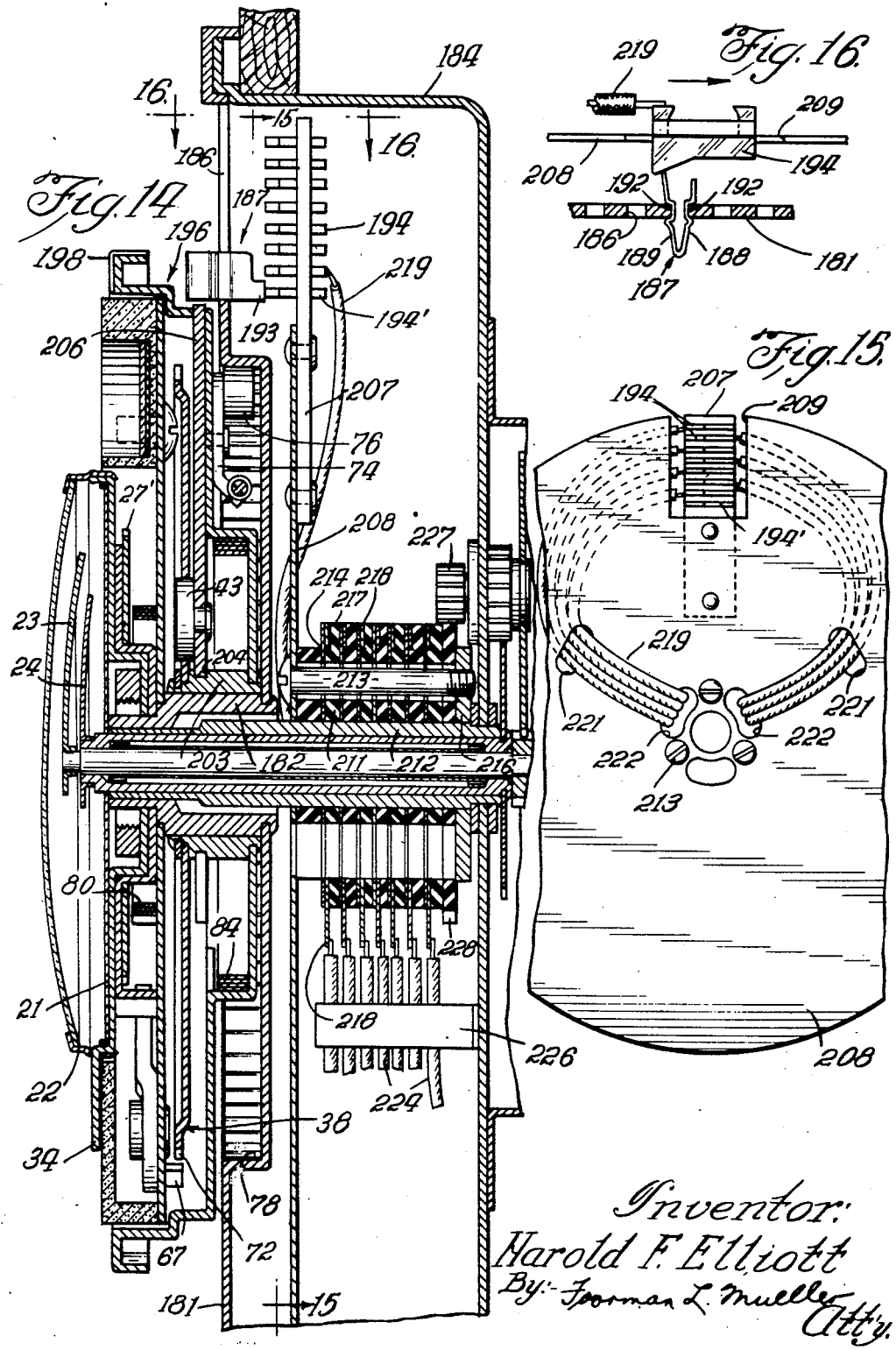
Inventor:
Harold F. Elliott
By: Foorman L. Mueller
Atty.

Patented Feb. 23, 1943

2,311,649

UNITED STATES PATENT OFFICE 2,311,649

PRESELECTOR APPARATUS

Harold F. Elliott, Palo Alto, Calif.

Application May 5, 1941, Serial No. 391,873

29 Claims. (Cl. 200—37)

This invention relates in general to control apparatus operating to set up a predetermined program for performing predetermined operations at desired time intervals over a period of twenty-four hours, or a greater or lesser period, as desired. More particularly, this invention relates to a program preselector operating to effect desired operations at fifteen minute intervals over a twenty-four hour period of time. This application is a continuation in part of applications which issued as patents on May 6, 1941, numbered 2,240,498, and 2,249,499, respectively.

Program or function preselectors have been employed for a great many years, although their commercial application has been limited in many respects either by complexity of mechanism, and hence a relatively high cost, or by deficiencies in the general structure thereof, such that they could neither be set up conveniently for operation, nor operated with enough dispatch and flexibility so as to provide a device with outstanding utility. Of course, various timing devices acting in a very simplified pattern or for a single operation have found widespread use, but the present invention is related more to a class of devices for setting up a program to control a relatively large number of different functions over a relatively great period of time.

In the general class of program preselectors to which this invention relates, there are substantially two classes or types, namely, an open-face type where the entire program preselected is visible, and the type exemplified by the structures of the above-mentioned applications where little of the mechanism is visible and the preselected program is concealed within the housing for the device. The latter type manufactured in accordance with my preceding inventions has enjoyed marked commercial success, but the sales have still been limited somewhat by a relatively high cost.

The present invention relates to a device of the type having a visible preselected program, and including automatic means for setting up the desired program. The entire mechanism is provided in a sturdy, compact unit which is comprised almost entirely of simple, inexpensive parts in metal stampings and molded plastics to provide an inexpensive device as a whole. Also the device provides for precision operation and control even though it is simple and inexpensive. Furthermore, the present invention lends itself to pleasing structural and color designs to enhance the over-all beauty and appearance of the device.

Among the features of the present invention is the means for quickly and accurately setting up a program over fifteen minute intervals for a twenty-four hour period and accomplishing the setting by manually operated automatic means. It is understood, however, that the invention is not limited to operation either over this particular period or interval of time.

Another feature is the provision of a plurality of stamped metal sliders which are settable by the automatic means, and themselves serve as conductors corresponding to the fifteen minute intervals in the twenty-four hour period, as well as the interconnectors for routing a circuit through selected function conductors. Inasmuch as the present illustrated embodiments are all adapted to operate a radio receiver system, the function conductors will correspond to broadcast stations to which it is desired to tune the radio receiver.

A still further feature of the present invention is the provision of simplified and effective brush, contact, and timing means for completing circuits to energize the apparatus controlled by the preselector at the desired intervals of time in accordance with the program set up.

Other objects, features and advantages of the invention will be apparent from the following description taken with the drawings, in which:

Fig. 5 is a view similar to Fig. 4 showing the setting mechanism in a changed position with reference to Fig. 4. The mechanism is in a position of rest in Fig. 4, and in a changed position in Fig. 5;

Fig. 6 is a rear elevational view with the rear housing removed;

Fig. 7 is a sectional fragmentary view along the line 7—7 of Fig. 6;

Fig. 8 is a detailed enlarged view along the line 8—8 of Fig. 6;

Fig. 9 is a detailed fragmentary view in perspective of a slider and its associated mechanism;

Fig. 10 is a circuit diagram of the preselector device of Fig. 1 in a complete system including an electric tuner and a radio receiver;

Fig. 11 is fragmentary front elevational view of a modified embodiment taken as divisible subject matter from the application which issued as Patent No. 2,240,498 on May 6, 1941;

Fig. 12 is a sectional view thereof along the line 12—12 of Fig. 11;

Fig. 14 is a sectional view along the line 14—14 of Fig 13;

Fig. 15 is a fragmentary detail view of a portion of the brush mechanism;

Fig. 16 is an enlarged detail view of a slider and brush taken along the line 16—16 of Fig. 14.

In practicing my invention I provide a preselector device for connecting to controllable apparatus, and including a plurality of radially slidable conductor members, sildable in a plane at right angles to the general operating axis of the device, and corresponding to desired intervals of time over an operating period. The conductors are slidable to predetermined radial positions corresponding to some one of a plurality of generally concentric conductors within the apparatus, and the latter conductors correspond to the various functions or apparatus it is desired to control with the preselector device. Means for setting said slidable conductors to said predetermined radial positions include a pusher which is rotatably movable about the axial center in a plane parallel to the plane of movement of the conductors until it is in radial alignment with a selected slider. With the pusher moved into alignment with a radially movable selected slider, a finger or index dial is manually rotated, and through connecting means including a member with an eccentric surface, the pusher is moved radially. The selected slider is moved by the pusher a radial distance corresponding to the angular distance over which the finger dial is rotated. Contact and timing mechanism operating in conjunction with the clock associated with the preselector acts to route and complete a circuit through selected sliders set up over the entire desired program to close or open circuits at predetermined intervals of time, and operate apparatus connected into said circuits.

Figure 1:
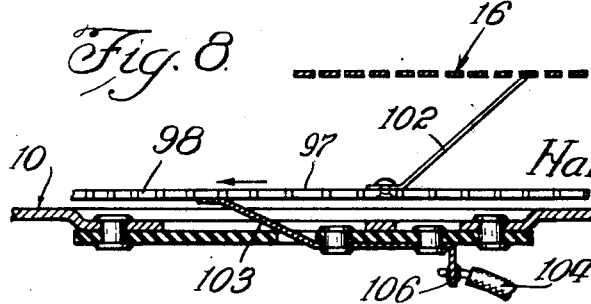
Fig. 1 is a front elevation of the preselector device.
Figure 2:
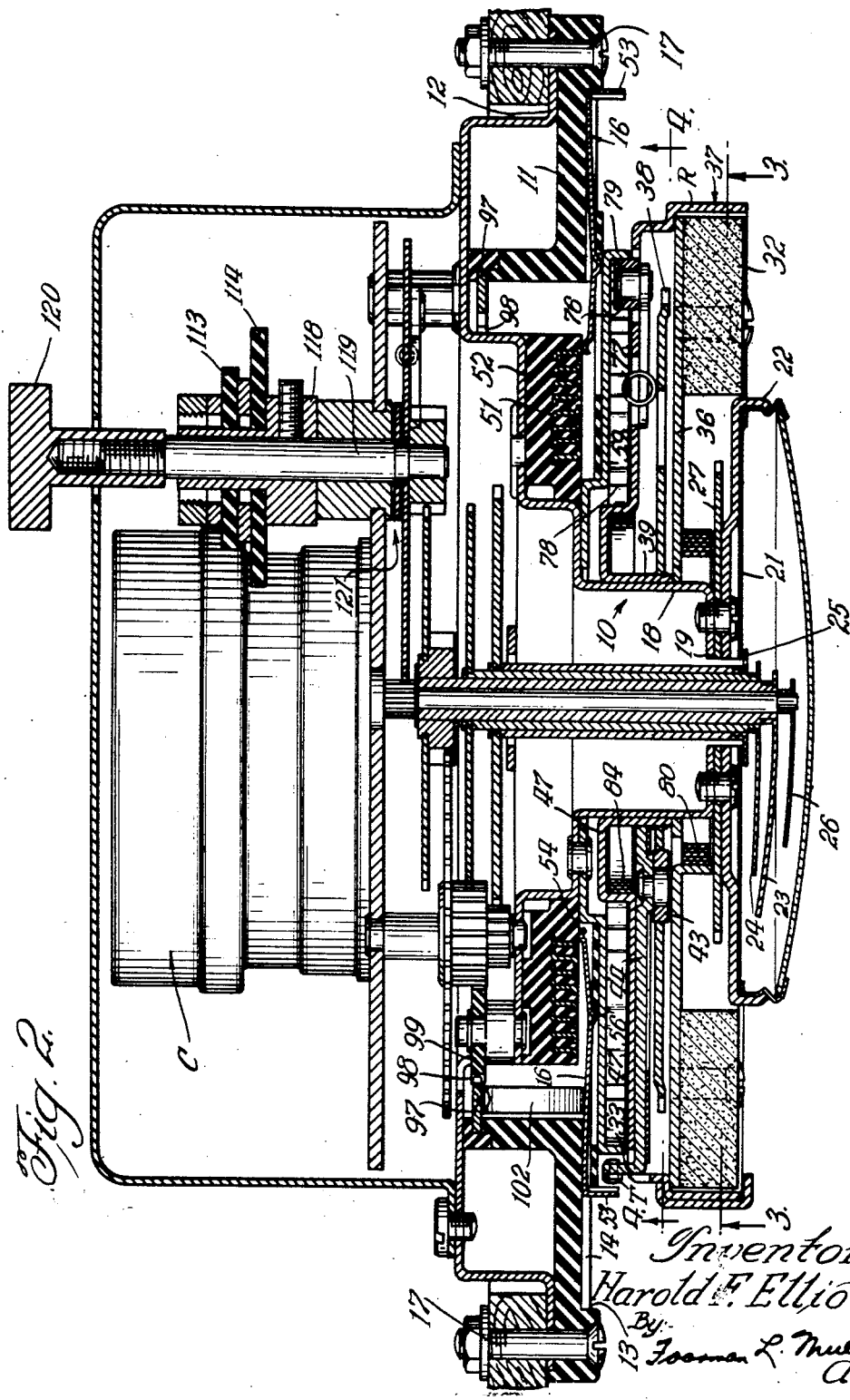
Fig. 2 is a horizontal cross-sectional view along the line 2—2 of Fig. 1 and looking in the direction of the arrows indicated on such line.

As can be understood from Fig. 2, particularly, substantially the entire mechanism illustrated therein comprises simple stamped, and molded parts. These parts include a principal frame member 10 formed with a plurality of annular steps upon which, and about which, associated elements are mounted. A ring of insulating material 11 is secured to an outside portion 12 of the frame member 10, and the member 11 includes a rim visible at the face of the device as shown in Fig. 1 with an inside annular shoulder 13. A central portion of the ring 11 includes a plurality of radially extending grooves 14 supporting sliders 16 with each slider corresponding to a fifteen minute interval of time in the twenty-four hour period as will be hereinafter more specifically described. The ring 11 is secured to the portion 12 of the principal frame member by bolts or screws 17, or the like. The frame member 10 and ring 11 thereon remain stationary in the preselector device.

The central portion of the member 10 comprises a cup-like portion 18, apertured at 19 to receive the rotatable mechanism for the hands of a clock, and acting to support clock dial 21 mounted within a frame 22. A twelve-hour face is provided for the dial 21, and a minute hand 23, an hour hand 24, a twenty-four hour hand 25, and a second hand 26 move over the dial face. The preselector device, as illustrated herein, is adapted for twenty-four hour operation, and the two twelve hour periods indicated on the face edge of an index dial 32 can be read in conjunction with the movable hand 25. Different colors can be employed in these figures to indicate whether the particular hour is in the day-time period or night period. The timing, circuit routing, and switch mechanism which will be described is adapted for twenty-four hour operation, and as is evident from Fig. 1 there are 96 sliders 16 corresponding to the 96 fifteen-minute intervals over a twenty-four hour period.

In the prior art program selecting devices in which a set-up program was visible on the face of a clock mechanism or the like, sliders or movable conductors for setting up a program according to time and a function, were all set up individually by a hand operation. In order to electrically interconnect transversely extending conductors, or the like, the sliders had to be very carefully set to a cross point in the conductor pattern, and this necessitated rather laborious searching and careful manipulation on the part of the operator to find the precise cross-point, or else the slider was not properly placed with reference to transverse conductors and the apparatus would fail to complete a desired operation. The present mechanism provides all of the advantages of a visual program set-up, and in addition provides simple apparatus for automatically and selectively moving each of the sliders to the precise point of electrical interconnection with a conductor to route a circuit. Mechanism for accomplishing this includes a stationary stamped gear 27 secured intermediate the dial frame 22 and the frame portion 18 (Fig. 2). An integral lug 28 (Fig. 3) on the gear 27 acts as a stop for the moving connecting mechanism including a bell crank lever 29 which serves with associated elements to connect the finger or index dial 32, and a slider setting member 33 which may be designated as a mover or a pusher (Fig. 4).

The dial 32 is provided as a molded plastic or the like member, and includes a plurality of finger holds F corresponding in number to the functions desired to be controlled by the apparatus. For purposes of illustration the present device is described as connected into a radio receiver system, and consequently seven of the finger holds F carry broadcasting station indicia, and the eighth hole F is used to index the "off" position of the radio receiver system when a finger is inserted in this hole and the dial moved to a stop position, as will be explained. The stop for the finger dial comprises a fixed apron, or the like 34, secured to the dial frame 22. The finger dial 32 is secured to a metal plate 36 (Fig. 3) rotatably mounted within, and movable relative to, a cup-shaped metal member 37 which is journalled on the projecting portion 18 of the main frame member 10.

The cup-shaped member 37 serves as a mounting member for a movable rotary unit which includes a toothed cam member 38 rotatably secured to an inner annular flange 39 of the member 37, and such toothed member 38 includes a cam groove with an eccentric surface 42 thereon. The groove and surface 42 guides a follower 43 (Fig. 4) which is mounted on the body portion 44 of the pusher 33. The body portion 44 of the pusher 33 in turn is mounted for slidable radial movement in a channelled guide member 46 rigidly secured to the base or bottom 47 of the cup-shaped member 37 (Fig. 2).

In preparing to set up a program or at least move a slider 16 radially to a desired predetermined position, the plunger or pusher 33 is first moved angularly into alignment with the desired slider. This is accomplished by grasping with the fingers the outside rim R of the member 37, and simply moving the member 37 and its associated elements just described to a position such that the pointer 48 (Fig. 1) on the rim of such member is opposite the desired slider. As is understood from the above explanation, the toothed member 38, and the plunger 33 and mounting 46 therefor, will move with the member 37 as a unit.

In order to set in operation a particular function, or as in the present instance, close an electric control circuit for tuning the radio receiver to a station corresponding to the desired station indicated in a finger hole F, a plurality of concentric conductor rings 51 are provided corresponding in number to finger holes F. These ring conductors are molded into an insulating block 52 secured to one of the steps in the main frame member 10. One edge of each ring 51 is available at the face of the insulating block for contact with a slider 16. As is clear from Figs. 2, 7 and 9, particularly, each slider comprises a one-piece member of yieldable metal which is formed with an upturned ear 53 at one end for engagement by the tip T of the pusher 33, and includes a rounded contact portion 54 at the other end. The body of the slider is substantially V-shaped longitudinally with a raised projection and nib 56 thereon intermediate the ends, while cross-wise the slider tapers from a wide to a narrow dimension from ear 53 to contact 54. Each slider is projected or pushed into a groove 14 in the insulating block 11 and by virtue of the shape and yieldability of the slider it is maintained under tension between the bottom of the groove 14 and top limiting means, as will be described. The tapered configuration facilitates this insertion.

The limiting means at the top, or front (as shown in Figs. 2 and 7) of each slider includes an annular insulating plate 58 which is secured to a stationary metal member 59, which in turn is mounted upon the frame member 10. The insulating plate 58 includes a plurality of stamped out elongated apertures 62 corresponding in number to the grooves 14 carrying the sliders. The projection or nib 56 intermediate the ends of each slider, and intermediate the sides thereof, as shown in Fig. 9, rides in the aperture 62 while the face of the slider body adjacent the nib slides on the under-face of the insulating plate 58 adjacent the elongated aperture. The length of the aperture, together with the shoulder 13 on the block 11, determines the limits of movement radially of the slider 16, and the groove 14 and aperture 62 in cooperation with the slider itself maintains the slider in a straight radial line in alignment with the end of the pusher. As is evident from Fig. 2 particularly, the slider 16 acting itself as a conductor, can be selectively moved into engagement with one conductor ring 51 at a time. The slider 16 is shown in its full extended position at the right hand side of Fig. 2 with the lug 53 against the shoulder 13 of the insulating plate 11, while at the left hand side of Fig. 2, and in Figs. 7 and 9 the slider is shown in its innermost position or starting position for setting up a program.

The slider and slider supporting and guiding mechanism, as well as the plunger or pusher mechanism have been fully described, and the method of positioning the pusher with reference to a slider has likewise been described. The operation of the plunger or pusher 33 in a radial direction to in turn move a slider 16 outwardly from a starting position to a set position will now be described. As previously mentioned, a bell-crank lever 29 is pivotally mounted by means of a pivot 64 (Fig. 3) secured to the plate 36 mounting the finger dial 32. In a position of rest for the finger dial 32, one end 66 of the bell-crank lever is in engagement with the lug 28 on the stationary gear 27, while the other end having a pawl or integral lug 67 thereon is in position within the aperture 68 in the plate 36 for engagement with a tooth in the cam plate 38. To illustrate the changed position of the dial 32 in Fig. 5, it is considered that the operator places his finger in the hole F having the indicia KGO and the dial 32 is rotated clockwise until the finger engages the stop 34. Upon the first movement of the dial 32, as the pivot 64 for the lever 29 moves with it, the spring 69 acting on the bell-crank lever pivots it into a position so that the pawl 67 engages a tooth 72 in the toothed member 38. Thereafter, as the dial is rotated clockwise, the lever 29 moves the toothed member 38 therewith, and the cam groove with the eccentric surface 42 causes the follower 43 therein to roll and move radially with the arcuate or angular movement of the groove, and consequently move the pusher body 44 and tip T therewith in a straight-line radial direction. Flanges within the guide member 46 maintain the pusher in a straight-line direction as can be understood from Figs. 4 and 5.

In the meantime the cup 37, to the base 47 of which the guide member 46 is secured, is maintained stationary relative to the movable dial 32 by means of holding or index mechanism illustrated in Figs. 2 and 4. This includes a bell-crank lever 74 pivotally mounted intermediate its ends on the bottom 47 of the member 37, having a roller 76 at one end, and a tension spring 77 at the other end. The roller 76 and spring 77 are both positioned in corresponding apertures within the base 47, as shown in Fig. 2. The roller 76 rides in notches 78 formed in the inside of the rim 79 of the stationary plate or cup 59, secured to the main frame member 10, as previously described. The spring 77 maintains sufficient tension on the lever 74 so that the unit including the cup 37 is maintained stationary at an adjusted position, but yet will permit ready manual movement of the unit to originally set the pusher or mover 33, as described.

As the tip T of the moving pusher engages the ear 53 of the selected slider 16 the latter is moved radially outwardly a distance corresponding to the radial movement of the follower 43 on the eccentric surface in the cam groove. For instance, if the dial 32 was operated from the finger hole F with the indicia KRE, the member 38 would be rotated a distance substantially equal to the arcuate length of the cam groove causing the tip T to move outwardly to its maximum position and place the contact portion 54 of the slider on the outside concentric ring 51, as is shown on the right-hand side of Fig. 2.

Figure 3:
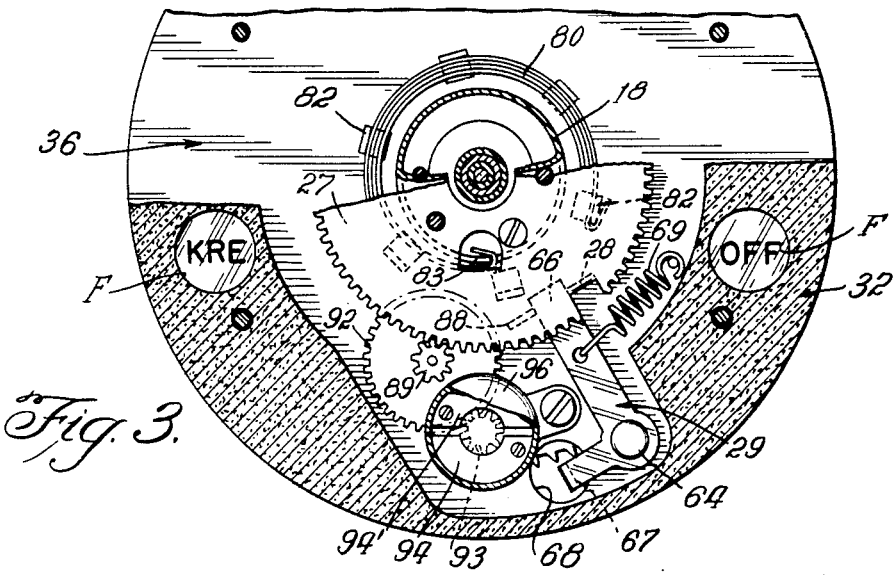
Fig. 3 is a fragmentary view, partly in section, and partly in full of the finger or index dial and connecting means therefor, together with retarding mechanism to retard the return movement of such dial. This figure is taken along the line 3—3 of Fig. 2.
Figure 4:
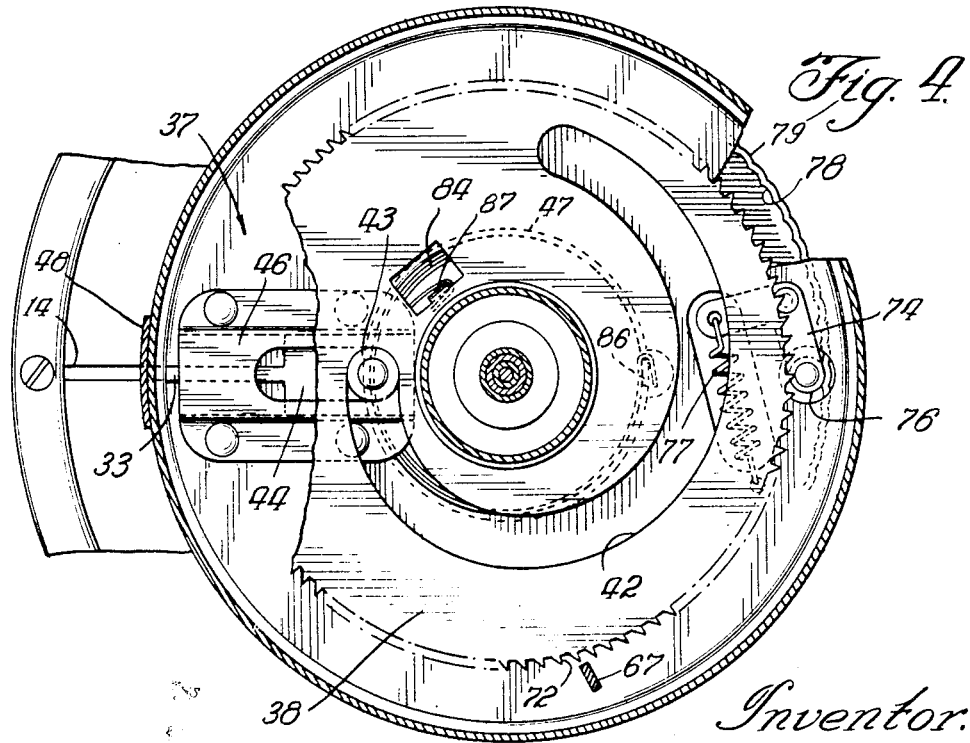
Fig. 4 is a cross-sectional view along the line 4—4 of Fig. 2 showing various parts of the manually operated automatic setting means in section, in full, and in a fragmentary illustration.

The dial 32 and associated mechanism is returned from an operated position as shown in Fig. 5, to a position of rest, as shown in Figs. 1 and 3, by means of coiled return springs. A coiled spring 80 is supported on the plate 36 for the finger dial within lugs 82 stamped out at intervals in a circular path around the central portion of such plate. One end of the spring 80 is connected to one of the lugs 82, while the other end is connected to a lug 83 on the stationary cup 18. A coiled spring 84 (Fig. 4) rests in an annular cavity (Fig. 2) at the inside portion 47 of the dial cup 37, is secured at one end to a cut-out portion 86 in the rim of the annular cavity, and is secured at the other end to a lug 87 turned inwardly from the cam plate 38. These springs are tensioned when the dial 32 is rotated clockwise, and act to return both the dial and the cam plate to a position of rest. At this position the end 66 of the lever 29 engages the lug 28, as heretofore explained, and the lug 88 on the dial plate 36 engages the other side of such lever end 66 to stop the dial. The cam groove in the plate 38 is so proportioned in length that the follower 43 will be in engagement with the end of it, as shown in Fig. 4, when the lug 88 engages the bell-crank lever at 66, so that the pawl 67 is thrown out of engagement with a tooth 72 in the plate 38 when the lever hits the lug 28.

Retarding mechanism is shown in Fig. 3 for slowing the movement of the dial 32 and cam plate 38 on the return movements under the forces of the springs 80 and 84. This mechanism includes a gear train including gears 89 and 92, with the latter engaging a corresponding pinion gear 93 rotatably supported on the dial plate 36. A pair of friction pawls or shoes 94 and 94' are each pivotally mounted at one end on supporting means movable with the pinion gear 93. As the pinion gear 93 is rotated the pawls are thrown outwardly by centrifugal force and frictionally engage a stationary cap 96 secured to the plate 36. By this frictional engagement the movement of the gear train and hence the dial and associated dial plate 36 are retarded. By virtue of the pawl 67 of bell-crank lever 29 connecting the dial plate 36 and cam plate 38 these move together. Hence the retarding mechanism in effect acts on the entire counter-clockwise moving structure.

As might be understood from the preceding description of the metal conductor sliders 16 and the concentric rings 51, these together are part of a circuit routing means for routing a circuit at each fifteen-minute interval set up on the program preselector to effect a desired operation of the controlled apparatus connected to the program preselector. This is likewise evident from a consideration of Fig. 10. The sliders 16 are each selectively movable or settable to a predetermined function ring 51, and further means within the circuit routing means are also provided to extend a circuit through each set slider irrespective of the position of the slider. The latter means includes a continuously rotating (at least so long as the clock C operates) ring gear 97 (Figs. 2 and 7) which consists of a flat metal ring member with gear teeth 98 on the inside edge thereof. The ring gear 97 is driven by a train of gears including the insulating pinion gear 99, which gear train has a ratio such that the ring gear 97 completes one revolution each twenty-four hours in the twenty-four hour preselector illustrated herein. A yieldable brush 102 (Fig. 8) secured to the ring gear 97 slides in an annular cavity between the insulating blocks or members 11 and 52, and successively engages the inside face of the body portion of the sliders 16. With a slider in a position, as shown at the left-hand side of Fig. 2 having its contact portion 54 on the insulating plate 52 and out of contact with the ring 51 there of course will be no circuit completed for that particular fifteen-minute interval. When the brush 102 reaches the slider 16 in the position at the right-hand side of Fig. 2, a circuit will be routed through the correspondingly engaged ring 51.

The ring gear 97 itself acts as a conductor, and a circuit through such ring gear is extended through a stationary brush 103 riding on one face, as shown in Figs. 7 and 8. The stationary brush 103 is insulatingly mounted at the rear of the preselector mechanism in a position such that a conductor wire 104 can be readily soldered to a terminal lug 106 on the stationary brush. On the other side of the routing circuit so far as the sliders 16 are concerned, are terminal members 107 conductively connected to corresponding rings 51 and extending out of the rear of the clock mechanism as shown in Fig. 6 to receive conductor wires 108.

A circuit may be completed at each fifteen-minute interval providing a slider 16 is set in contact with a ring 51, with precision-like timing and accuracy by means of a cam switch at the rear of the preselector mechanism, as illustrated in Figs. 2 and 6, which includes a switch unit 109 in electrical series connection with the conductors 104 and 108. This switch unit in turn includes a pair of switch arms 111 and 112 electrically connected to such conductors. The brush 102 and the sliders 16 are so proportioned that such brush rests on a particular slider for substantially fifteen minutes and then drops off to move to the next slider in succession. The change for the brush from one slider to the next occurs approximately halfway through a fifteen-minute interval, for instance, at approximately 12:07 for the interval between the slider at 12:00 and the slider at 12:15. The circuit is actually completed however through the contact points 111' and 112' on the switch arms 111 and 112, respectively, as they drop momentarily together under spring tension as the result of pattern of movement of the insulating cams 113 and 114. The shoulder 116 on the cam 114 is slightly ahead of the shoulder 117 on the cam 113 in angular positioning. These cams are both secured in a predetermined angular position on a bushing 118 secured to the shaft 119, which in turn is driven by an appropriate train of gears connected to the clock shaft so that the cams rotate completely each fifteen-minute interval. While riding on the circumference of the cams, the switch arms 111 and 112 are separated and their corresponding contacts 111' and 112' are likewise separated, but as the switch arm 112 drops past the shoulder 116 contact is completed because the switch arm 111 is still retained on the circumference or cam edge of the cam 113. When the switch arm 111 drops past the shoulder 117 on the cam 113, contact is broken. In the meantime, while contact is maintained at the switch arms, the circuit is completed through the switch 109 (Fig. 10) which is in series with a radio control device including a tuning motor 122. Assuming that the master switch 123 of the complete electrical system for the radio is closed, and the power transformer 124 therein energized, the automatic tuning device for the radio receiver is likewise in operating condition. The tuning motor 122 is energized upon closing of the switch 109 and tuning is accomplished to the station represented by the ring 51 to which the particular slider 16 at that interval of time is connected. Merely for purposes of illustration for a better understanding of the complete system, push buttons 126 and magnets 127 are shown as parts of the tuning circuits in series with the corresponding rings 51 in the program preselector so that a particular station can be tuned in by an operator independently of the program preselector itself.

No detailed description has been made of the various shafts for the clock hands, nor of the numerous gears and gear trains involved in the entire clock and general driving mechanism. This is not specifically claimed herein. However, for purposes of understanding it is mentioned that the clock is set by knob 120 on the cam shaft 119, and operating through a slip clutch indicated generally by the reference character 121.

Figs. 11 and 12 illustrate a modification of the program preselector, and, in fact, are taken directly from application Serial No. 82,495, filed May 29, 1936. In this arrangement, the time busses or conductors as 131 are placed radially about the clock motor 132, and the station busses comprise a plurality of conducting rings 133 concentric with the axis of the clock. An hour hand 135, and a minute hand 135', shown at the left-hand side of Fig. 12, are operated by the motor 132. The interconnectors or sliders as 134 slide radially on the time busses as 131, and insulating tabs as 136 project through slots, as 137, in dial 138, to provide for moving the interconnectors 134 by means of one's fingers or other means. This construction enables the setting of any one interconnector without disturbing the setting or the lack of setting for the remaining interconnectors. A twenty-four hour arm 139 carrying a pivoted contact member 142, provides means of establishing a circuit to the time busses 131 in succession, through a right-angled portion 143, as shown in Fig. 12.

When minimizing cost is an important consideration, the arrangement above-described providing for direct finger movement or operation of the interconnectors via the tabs, is complete in itself. When the cost factor permits, a telephone type of finger index or station dial as 144, together with a manually operated time index dial as 146 may be added for automatically selecting and setting the interconnectors in a manner similar to that already described for the first embodiment illustrated.

The station dial 144 is arranged to actuate a cam 147, and the cam in turn actuates a follower 148, which is secured to or integral with a pusher unit 149. The latter includes a push rod 152 for moving the interconnectors 134 from the inside bus 133 to one of the outwardly or radially disposed concentric busses. By inserting a finger in a hole 153 and rotating the dial 144 various angular distances corresponding to the various finger holes, the cam 147 and push rod 152 may be made to push the interconnectors to the corresponding station busses.

The push rod 152 may be set opposite any desired time bus 131 by grasping and rotating the time index dial 146, relative to dial 138. The dial 146 is provided in a substantially cup-shaped member having a plurality of notches 154 in the periphery thereof corresponding to the 96 time graduations (fifteen minute intervals over twenty-four hours). A spring member 156 appropriately and rigidly secured to the outside of the clock 132 rides in the notches 154 and acts to hold the dial 146 in any adjusted position.

In operating this mechanism of Figs. 11 and 12, the dial 146 is rotated by grasping the outside of the rim or periphery, and the push rod 152, extending through an opening 166 in the rim of such dial, is moved therewith until such push rod is opposite the desired time indication on the stationary dial 138. A connecting mounting or bushing 167 is rotatably supported on the bushing 162. This bushing 167 rotatably supports the dial 146 and the cup-shaped member 158 carrying the rack 157, and these latter two members are rotated with the dial 147 upon movement of such dial.

After the push rod 152 is set opposite a selected slider, station dial 144 is then rotated clockwise, and pawl 164 engages rack 157, which in turn rotates cam 147. The dial 144 is rotated until the operator's finger in a dial hole engages the stop 168. In the meantime the cam 147 rotating under movement of arm 159 carrying the pawl 164 in engagement with a notch or tooth 157, acts on the pin or follower 148 on the push rod 152 to move the latter a radial distance corresponding to the angular movement of the dial 144 to engage and set an interconnector 134 to a station ring 133 which in turn corresponds to the finger hole in the dial. The push rod 152 is guided by means of the aperture 166 in the dial 146 and by the elongated apertured guide frame portion 169 on the push rod unit which is slidable on the assembly at the bushing 167.

The dial 146, after it is set as desired, remains stationary during movement of the dial 144 by virtue of the spring member 156. With the dial 144 moving clockwise to stop 168, arm 159 is moved away from stop 172, and cam 147 is moved away from stop 173. A retracting spring 174 is provided for the push rod unit 149, and a clock spring 176 secured at one end to the frame member or dial 138, and at the other end to the bushing 162 assembly, acts to retract the dial 144. Spring 174 pulling on follower or push rod unit 149 acts on the cam 147 through the pin 148 as previously described. The follower or pin 148 under the tension of the spring 174 causes such cam to return to the rest position against stop 173. In the meantime the arm 159 has engaged the stop 172, and the pawl 164 has been lifted out of engagement with a tooth 157 by the stop 177 on the member 158. In this condition of rest, member 158 may be rotated freely to choose any desired time setting on dial 138 without actuating the cam 147 or follower 148.

Again referring to the rack or member 158 and to initiating a slider-setting operation this member includes the plurality of circularly disposed teeth 157 corresponding in number to the time settings represented by radial conductors 131, or some multiple thereof. The pawl 164 will engage a tooth with practically no lost motion upon the initial movement of the dial 144 regardless of the angular position of the dial 146 with reference to the dial 144. With the rack and pawl construction, dial 146 rotatably supported with cup 158 by means of bushing 167 may be rotated independently of dial 144, and yet the follower 148 actuated by cam 147 on cup 158 will be moved to move the push rod 152 radially substantially simultaneously with the beginning of rotation of dial 144 for a station setting of an interconnector.

A further modification of the present invention is illustrated in Figs. 13 to 17, inclusive. The slider setting mechanism of this embodiment is substantially identical with that in the device of Figs. 1 to 10, inclusive, and the same parts have been given the same reference characters as in the first described embodiment. The principal differences in structure lie in the circuit routing means for the program preselector including a metal slider carrying frame 181 which also acts as a conductor in such means. The plate or member 181, which preferably comprises a cast or stamped metal plate is rigidly secured at its central portion to a stationary bushing 182, and is secured at its outer portion by means of screws or the like 183 extending into a stationary frame member 184. The plate 181 includes a plurality of radially extending slots 186 (Figs. 13 and 16) corresponding in number to the desired number of time intervals over the entire program. In the present embodiment, as in the two previously described embodiments, there are 96 slots corresponding to the 96 fifteen-minute intervals in a twenty-four hour period.

A time conductor or slider 187 is slidably carried in each slot 186. As shown in Figs. 14 and 16, each slider consists of a one-piece substantially V-shaped element having a pair of spring-tensioned legs 188 and 189, with a channel 192 in each leg to maintain the slider on the frame plate 181 in engagement with the sides of a slot 186. The leg 189 is longer than the leg 188 and extends into the mechanism as shown in Fig. 14 so that a tip 193 is available for engagement by corresponding shoes or brushes 194 corresponding to the functions to be controlled by the program preselector.

The position of rest for each of the sliders 193 is the inner radial position as shown at the top of Fig. 14. The sliders are moved into this position by hand from any radial set position in the slots 186. In setting up the program the rotary substantially cup-shaped member 196, corresponding to the member 37 in Fig. 2 and the member 146 in Fig. 12, is grasped by hand at the notched edge 197 and moved to an angular position with the notch 198 in alignment with a selected slider. The index roller 76 on a bell crank lever 74 (Figs. 13 and 14) rides in a notched surface 78 in the corresponding flange of the stationary frame plate 181, and retains the unit including the member 196 in a desired angular position.

Figure 13:
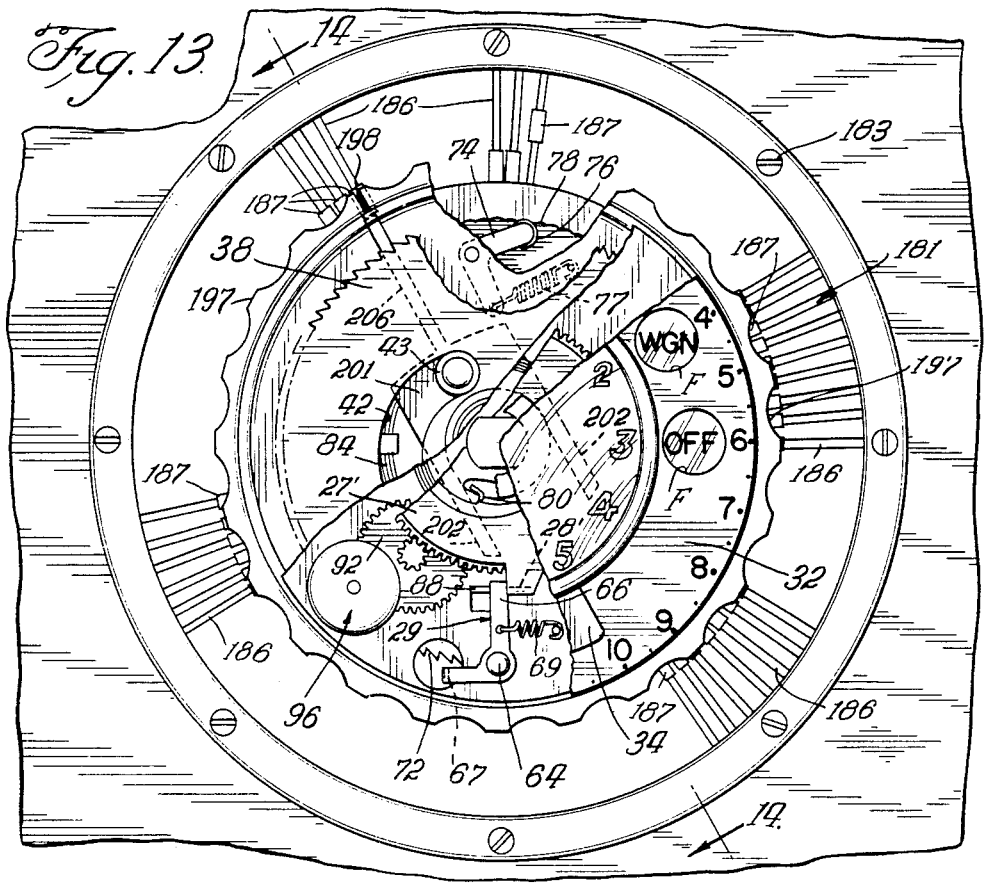
Fig. 13 is a front elevation with some portions broken away of a modification of the device of Fig. 1.

The pusher or slider mover of this embodiment operates the same as that in the first embodiment particularly, and resembles the pusher construction of the second embodiment. The entire pusher unit comprises a body portion 201 having a pair of integral legs 202 straddling and riding on a bushing 203 rotating on the bushing 182 and rigidly secured to the cup-shaped index member 196. A groove 204 guides the legs 202 in their radial reciprocating movement. Integral with the body portion 201 is the pusher rod 206 itself, which is in alignment with a notch 198, as shown in Fig. 13, and moves radially to move a slider 187 therewith. A follower 43 rotatably secured on the body 201 of the pusher unit rides in a cam slot with an eccentric surface 42 in a cam plate 38. This transforms the rotary movement of the dial 32 to linear movement in the pusher rod 206, as previously described. The operation of the finger dial 32 and the inter-connecting mechanism including the bell crank lever with the pawl 67 engaging corresponding teeth 72 in the plate 38 corresponds to the structure for Fig. 1. The stationary gear is very slightly different from that for the embodiment of Fig. 1, but has been given a reference character 27', because the body portion of which the lug 28' is integral, has a slight variation from the original structure, as is evident from Figs. 3 and 13. The dial 32 and cam plate 38 return to a rest position in the same manner as originally described by means of springs 80 and 84 acting thereon.

Instead of stationary conductor rings corresponding to the various functions controlled by the program preselector as employed in the two preceding embodiments, rotating means are employed herein to route a circuit through the desired radio station tuning means at a particular interval of time. This rotating means comprises the shoes or brushes 194 secured to an insulating arm 207 which in turn is rigidly secured to a rotary plate 208. The plate 208 has a notch 209 therein as shown in Fig. 15, to receive the brushes 194 and their mounting arm 207 and permit freedom of movement between the brush assembly and the plate. Plate 208 in turn is secured to a rotary stack comprising a plurality of insulating members 211 riding on an elongated bushing 212, and secured together by a plurality of bolts 213 extending through corresponding apertures in the stack elements. Intermediate each two insulating members 211 is a conductor ring 214 rigidly secured into the stack by the tightening thereof and maintained out of engagement with the bolts 213 which extend into a back plate 216. An annular groove 217 is provided on one face of each insulating member 211 at the periphery thereof as shown in Fig. 14, and this groove is wide enough to accommodate a metal slip ring 218 which remains stationary relative to the movable stack and yet is in continuous physical and electrical connection with the corresponding rings 214.

Figure 17:
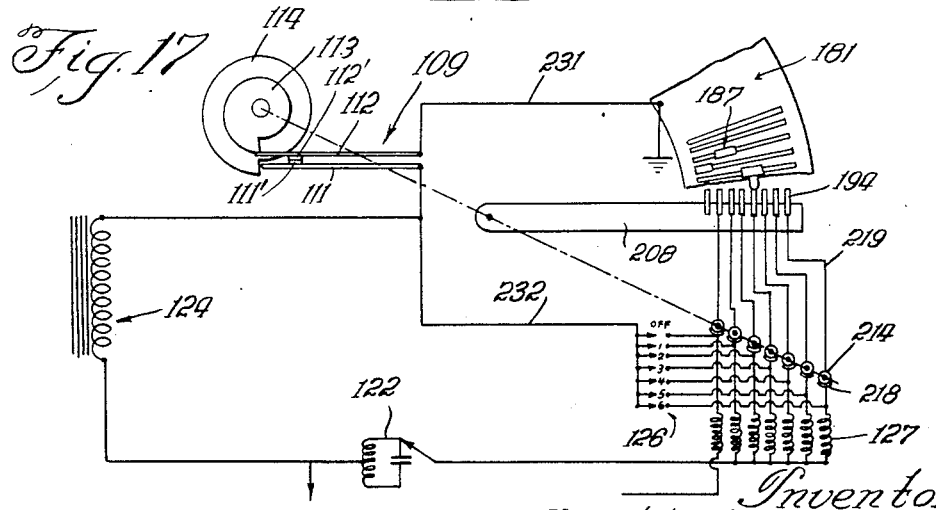
Fig. 17 is a circuit diagram of the device of Figs. 13 to 16, inclusive.

The inner radially spaced shoe or brush 194' merely serves to maintain the brush 194 and arm 207 assembly moving generally in the same plane when passing over a slider 187 in the position of rest shown in Fig. 14 at the top thereof and engaging the tip 193 of such slider. However, all of the remaining brushes 194 correspond to stations or functions represented by the indicia in the finger holes F of dial 32. Wire conductors 219 extend from the rear of each brush 194, as shown in Figs. 14 and 16, through apertures 221 and 222 in the plate 208 to connect with corresponding rings 214, all in the movable brush assembly or unit. As shown in Fig. 17, the circuit extends from switch 109 to plate 181, thence through sliders 187, shoes 194 and conductors 219 to rings 214, thence by means of conductors 224 from the slip rings 218 to the magnets 127 identical with that in Fig. 10. The conductors 224 are all taped or otherwise secured together within the frame member 184 and carried on a bracket 226 so that they are maintained stationary, and the support of these conductors alone is sufficient to maintain the slip rings 218 substantially stationary relative to the slowly movable conductor rings 214. There, of course is a slight yielding motion at times, but this soon rights itself, so that the general relative position between the two groups of conductor rings is not disturbed.

The brush stack including the plate 208 rotates through one revolution each twenty-four hours and is driven by a pinion gear 227 appropriately geared to the desired speed from the clock motor C in the general manner illustrated in Figs. 2 and 14. Pinion gear 227 operates on a ring gear 228 in the bolted stack. For simplification, no twenty-four hour hand for the clock itself is illustrated in Fig. 14, but it is understood that a hand, such as hand 26 in Fig. 1, could be employed on this embodiment in the manner heretofore described. Alternatively, the position of shoes 194 may be observed by looking through slots 186.

The circuit diagram of Fig. 17 is somewhat fragmentary and, as a diagram of a complete radio receiver system for this embodiment, can be understood by reference to Fig. 10. All of the conductors and elements in Fig. 10 to the left of the power transformer 124 and below the illustration of the tuning motor 122 and magnets 127 in the tuner, can be duplicated for the present system. The operations are timed by the cam members 113 and 114 operating on the switch arms 111 and 112 of the switch 109, as previously described. With the system as a whole energized, program control is effected by completing a circuit through switch arm 111, switch arm 112, conductor 231, plate 181, a slider 187, shoe 194, slip rings 214—218, magnet 127, motor 122 back to transformer 124. Conductor 232 provides an alternate path to operate the tuner magnets and motor via push buttons 126. As previously described, the rings 214—218 are connected through conductors 219 with corresponding shoes or brushes 194, which in turn engage the sliders 187 at their tips 193. The switch 109 and the insulating cams 113 and 114 comprise a circuit closing and timing means, while the circuit is actually routed through the sliders 187 and their supporting plate 181, and through the movable brushes 194 and their associated conducting means.

As can be understood from the preceding description, the several embodiments of the invention provide a relatively simple and inexpensive, and yet precision-like program preselector. The program on each embodiment is set up automatically with precision-like accuracy upon manual or finger operation of a rotary dial, and is visible in its set-up condition. Program setting and the program control operations are completed primarily by means operating in a plurality of substantially parallel planes, all at right angles to the general operating axis, or longitudinally extending axial portion of the apparatus. The program setting operations are carried out entirely by mechanical means which are sturdy, and lend themselves to efficient, inexpensive manufacture and assembly. A single slider may be moved to interconnection with a desired function conductor, or all sliders may be moved one at a time into a desired pattern, and all these operations are accomplished while the clock is energized and the rotary brush mechanism of each embodiment is moving. In each embodiment the sliders are returned by hand to a rest position. Although the three embodiments illustrated and described are shown as applied to a radio receiver system and electrical control means therefor, it is understood, as previously mentioned, that the application of the device is not confined to this purpose, but may be utilized to control any desired number and type of operations, apparatus and the like, at the desired intervals of time, and all may be independent of one another.

Although the invention has been described and illustrated in its preferred embodiments. it is understood that it is not limited thereby, and is limited only by the scope of the appended claims.

I claim:

1. In preselector apparatus having a plurality of sliders for controlling electrical circuit routing therethrough, the mechanism operable while the preselector apparatus is in operation for selecting and setting said sliders to predetermined positions by two manual operations, said mechanism including a slider support unit having a portion supporting all of said sliders for selective movement thereof substantially in a single plane, a pusher member movable away from a position of rest in a plane parallel to the plane of movement of said sliders for selectively and individually moving said sliders, a pusher member support unit, means supporting one of said two units so that said one unit is rotatable relative to said other unit in one manual operation, and entirely mechanical means for moving said pusher member substantially in said single plane of movement from a position of rest including a driving member, an eccentric portion on one of said two members operatively engaging the other member, and means effecting movement of said eccentric portion in a second manual operation.

2. In a preselector program device for controlling a plurality of functions at predetermined intervals of time and having an axial center portion, the combination with a stationary frame having at least a portion thereof in a plane at right angles to said axial center portion, of means for setting up a program control on said stationary frame including a plurality of sliders on said frame movable in said plane at right angles to said axial center portion, and each in a direction radially relative to said axial center portion, slider mover means having a tip thereon adapted to be aligned selectively with a slider for moving a slider, means supporting said slider mover means to permit movement of said tip in a direction radially of said axial center portion, a rotatable finger dial having a plurality of finger holes therein corresponding to the functions to be performed by said device, means supporting said finger dial, and mechanical means operatively connecting said slider mover means and said finger dial.

3. In preselector apparatus including a plurality of sliders movable radially in a single plane and each slider having a conducting portion thereon, the means for selectively moving said sliders including a pusher engageable with a slider, means supporting said pusher both for a rotary positioning movement and for a radial straight-line movement in a single plane parallel to the plane of movement of said sliders, said pusher having a follower thereon, and eccentric means engaging said follower and movable in a plane parallel to the plane of movement of said sliders acting on said follower in a manner so that the movement of said eccentric means is converted into radial movement in said pusher.

4. In preselector apparatus, the combination with a plurality of radially slidable conductor means and stationary supporting means therefor having at least one portion in a single plane, of means for selectively moving said conductor means radially on said supporting means including a mover movable radially in a straight line for engaging and moving a selected conductor means therewith, means in a plane parallel to said plane of the conductor-means-supporting-means supporting said mover, cam means moving in a plane parallel to the planes of said two supporting means operatively connected to said mover, and means operatively connected to said cam means for moving the same.

5. In preselector apparatus having an axial center therein, the combination with a plurality of sliders and each having a conductor portion thereon, of a slider carrying unit having at least a portion thereof disposed in a plane at right angles to the axial center of said apparatus, and a slider setting unit including a setting member, means supporting said setting member for movement in a radial direction with reference to said axial center for selective engagement with and movement of a selected slider, with one of said units being rotatable relative to the other unit, and means having an eccentric surface thereon operatively connected with said slider setting member and movable rotatably to move said setting member radially upon rotary movement of said eccentric surface means.

6. In preselector apparatus having a longitudinally extending axial portion, a plurality of movable members, and frame means supporting said movable members in a plane at right angles to the longitudinally extending axial center, the combination of mechanical means for selectively moving a movable member in a radial direction relative to said axial portion within said plane of movement, including a first manually rotatable unit, a second manually rotatable unit, and mechanical connecting means including a portion operatively common to both units and movable with one of said two units while the other of said units remains stationary, and subsequently being movable with the other of said units while said first unit remains stationary, said portion including eccentric means having a driving surface thereon, means on one of said units operatively connected with said driving surface and adapted for selected engagement with a movable member, and means guiding said last mentioned means for radial straight line movement with reference to said axial portion.

7. In preselector apparatus having a longitudinally extending axial center therein, the combination of a plurality of movable conductors, means supporting said conductors for movement in a plane at right angles to said longitudinally extending axial center, mechanical means operated solely by manual force to selectively move said conductors including a pusher movable in a plane parallel to the plane of movement of said conductors and adapted to be projected radially in such plane, a rotary member for driving said pusher, and means including a rotatable member having an eccentric surface thereon and a connector in engagement with said surface operatively connecting said pusher and said rotary member, with said connector being movable radially relative to the rotary movement of said eccentric surface and acting to project said pusher radially a distance corresponding to the position of the connector on said eccentric surface.

8. In preselector apparatus having a longitudinally extending axial center therein, a combination with a plurality of sliders and means supporting said sliders for movement radially with reference to said axial center in a plane at right angles to said longitudinally extending axial center, of means for selectively moving said sliders including a pusher having a follower portion thereon, means supporting said pusher for movement radially in a plane parallel to the plane of movement of said sliders, and means having an eccentric surface thereon engaging said follower portion and being movable to move said follower portion and said pusher therewith in a radial direction.

9. In preselector apparatus having a longitudinally extending axial center therein, the combination with a plurality of sliders and means supporting said sliders for movement radially with reference to said axial center in a plane at right angles to said longitudinally extending axial center, of means for selectively moving said sliders including a pair of relatively movable operatively connected members, means supporting said members, with one of said members having an eccentric surface thereon and the other of said members having a follower thereon engaging said eccentric surface, and means operatively connected to one of said members to move the same.

10. In preselector apparatus, as defined in claim 9, with said one member having a cam slot therein with an eccentric surface in said slot, and the follower on said other of said members comprising projecting means riding in said cam slot and engaging said eccentric surface.

11. In preselector apparatus as defined in claim 9, with said one member including a cam portion having said eccentric surface on the outside edge thereof, and said follower on said other of said members comprising a pin extending at right angles to said cam and riding on said eccentric surface.

12. Electric control apparatus including a plurality of ring-like function conductors, a plurality of rod-like time conductors extending transversely thereof, a contact member slidable upon each time conductor for selective interconnecting position thereon with respect to a function conductor, a selector member, a time index member, and means for mechanically connecting said time index member and selector member to move the latter to alignment with a contact member, a function index member, means mechanically connecting said function index member and said selector member including a cam movable with said function index member, and with said cam operatively connected with the selector member to move said selector member upon movement of the function index member to thereby move the contact member slidably upon a time conductor.

13. Electric control apparatus for a radio receiver, including a plurality of fixed and insulating separated time conductors arranged in a manner so that one end of each conductor lies in a circular path, a plurality of station conductors extending substantially transversely with reference to said time conductors, a slidable interconnector on each of the time conductors for movement to interconnecting positions with reference to said station conductors, a clock having hour and minute hands movable thereon, and means movable corresponding to said hour hand for routing electric circuits through said conductors and interconnectors including a brush arm movable with reference to the time conductors and having a spring tensioned contact member pivotally secured at the outer end of said brush arm for contact with the ends of the time conductors in the circular path and pointed at one end in a manner to confine the contact thereof with time conductors to only a single time conductor at one time.

14. In apparatus for determining the closing of electrical circuits for predetermined functions at predetermined times, the combination of a plurality of conductors, means supporting said conductors for movement in a single plane and in a direction radially relative to the center of said plane, mechanical manually operated means for automatically and selectively moving said conductors in said plane to predetermined radial positions, and means for extending a circuit through a selected conductor including a conducting portion corresponding to each of said predetermined functions, and brush means in electrical series connection with said conducting portions.

15. In apparatus for setting up a predetermined program as to time and function and controlling electrical circuits therewith having a plurality of movable conductor means, the means for successively extending a circuit through said conductor means including a plurality of concentric stationary conductor rings corresponding to the functions to be performed by said apparatus, a rotary ring gear having contact means thereon successively engaging said conductors, contact means in continuous engagement with said ring gear, and switch means in series electrical connection with said conductor rings and said contact means opening and closing at periodic intervals.

16. In apparatus for setting up a predetermined program as to time and function and controlling electrical circuits therewith, the combination with a plurality of radially movable conductor means and manually operated mechanism for selectively and automatically setting said conductor means in predetermined positions, of means for successively extending a circuit through said conductor means including a plurality of concentric stationary conductor rings corresponding to the functions to be performed by said apparatus and a rotary arm having a pivoted contact member at the outer end thereof shaped at one end so as to engage only a single conductor means at one time, and means supporting said rotary arm in a position such that said one end will successively engage said conductor means.

17. In apparatus for setting up a predetermined program as to time and function and controlling electrical circuits therewith, the combination with a plurality of radially movable conductor means and manually operated mechanism for selectively and automatically setting said conductor means in predetermined positions, of means for successively extending a circuit through said conductor means including a rotatable unit having a supporting member therefor, a plurality of brushes supported on said member with a brush for each said predetermined function, a plurality of brushes electrically connected with said first-mentioned brushes supported on said unit and movable therewith, a plurality of substantially stationary contacts in continuous engagement with said last-mentioned brushes, and switch means in series electrical connection with said conductor means and said substantially stationary contacts opening and closing at periodic intervals.

18. In apparatus for setting up a predetermined program as to time and function and controlling electrical circuits therewith, the combination with a plurality of conductor means corresponding to the functions to be performed by said apparatus, of means for routing a circuit through a predetermined function conductor means at a predetermined interval of time, including a plurality of sliders comprising an elongated metal member having a contact at one end, a projection intermediate the ends, and being substantially V-shaped over its length, and stationary supporting and guide means for said sliders including insulating means having a plurality of radially extending grooves therein supporting and guiding said sliders on one side thereof, and an insulating plate on the other side thereof having radial slots therein corresponding in number to said slider and receiving said projections therein to cooperate with the corresponding grooves to guide said sliders, with said insulating plate spaced with reference to said insulating means so as to assist in spreading said sliders over their length and maintain at least said contact ends under tension.

19. An apparatus for setting up a predetermined program as to time and function and controlling electrical circuits therewith, the combination with a plurality of conductor means corresponding to the functions to be performed by said apparatus, of means for routing a circuit through a predetermined function means at a predetermined interval of time including a plurality of sliders, each of said sliders comprising an extended body portion having a lug at one end thereof and a contact portion at the other end thereof and being bowed intermediate said ends so that the body portion may be moved from the bowed position sufficiently to put the contact portion under tension, and insulating means on two opposite sides of said sliders supporting and guiding the same and spaced apart a distance so as to spread the ends of the sliders and tension the body portion.

20. In apparatus for determining the closing of electrical circuits for predetermined functions at predetermined times, the combination with a plurality of sliders, of means for selectively positioning said sliders including a slider mover having a follower at one end thereof, a rotary member having a serrated edge and a cam slot internally of said edge receiving said follower therein, a rotary index dial unit for movement to predetermined angular positions corresponding to said predetermined functions, and means operatively connecting said rotary member and said index dial unit including a bell crank lever pivotally mounted on said index dial unit and having a pawl at one end thereof movable into and out of engagement with the serrated edge, and means for pivoting said lever pawl into engagement with a serration upon rotary movement of said dial.

21. In preselector mechanism, the combination including frame means, a plurality of members on said frame means movable radially with reference to a central portion of the mechanism common to all of said members, and operating means operatively common to all of said plurality of members operable to selectively move said members individually in a radial direction to a preselected position.

22. In preselector mechanism, the combination including frame means, a plurality of members on said frame means movable radially with reference to a central portion of the mechanism common to all of said members and spaced radially from the center of said central portion, operating means having a part intermediate said center and said movable members operatively common to all of said members, supporting means for said part so that it is movable in an arcuate path, with said part upon operation thereof acting to selectively move said members individually in a radial direction to a preselected position.

23. In preselector mechanism, the combination including frame means having a center portion, a plurality of members on said frame means individually movable radially with reference to the center portion, mover means movable radially and positionable at a selected member to move the same, and operating means connectible with said mover means and common to all of said plurality of members to move the mover means and a selected member.

24. In preselector mechanism having a plurality of annularly spaced contacts adapted to be placed in predetermined positions with no two contacts in the same radial line, means for extending an electrical circuit through predetermined contacts including rotary means having a yieldable portion extending radially thereon, a plurality of conductors mounted on said yieldable means, insulated from one another and spaced apart radially thereon, and conductor means electrically connected to said conductors.

25. In preselector mechanism having a plurality of sliders movable in a single plane and in a direction radially relative to a central portion in the plane common to all sliders, the combination including a slider supporting unit, a slider setting unit common to said plurality of sliders and having setting means with a part movable radially substantially in a single plane for engaging and selectively moving said sliders radially in the single plane of movement for said sliders, and frame and supporting means for said units to provide one of said units rotatable relative to the other unit.

26. In apparatus for determining the closing of electrical circuits for predetermined functions at predetermined times, the combination of a plurality of movable means, means supporting said movable means for movement in a single plane and in a direction radially relative to the center portion of said plane, mechanical manually operated means common to all of said movable means for automatically and selectively moving movable means in said plane to predetermined radial positions, and circuit operating means for operative connection with said selected movable means for closing corresponding circuits at corresponding times.

27. In apparatus for setting up a predetermined program as to time and function and controlling electrical circuits therewith, the combination including a plurality of radially movable means, manually operated mechanism common to all said movable means for selectively and automatically setting movable means in predetermined positions, a rotary member having circuit operating means therewith cooperating with said radially movable means for setting up circuits for predetermined functions, and switch means in series electrical connection with said circuit operating means for closing said circuits at periodic intervals.

28. In apparatus for determining the closing of electrical circuits for predetermined functions at predetermined times having circuit operating means, the combination including a plurality of movable means, means supporting said movable means for movement in a single plane and in a direction radially relative to the central portion of said plane, each of said movable means having a substantially longitudinally extending body portion of yielding material bowed laterally intermediate the end portions thereof, with one end portion connectible into an electrical circuit which includes the circuit operating means, and mechanical manually operated means common to all of said movable means for automatically and selectively moving movable means and having a part for engaging a selected movable means at the other end portion to move the selected movable means radially in said single plane.

29. In apparatus for determining the closing of electrical circuits for predetermined functions at predetermined times having circuit operating means, the combination including a plurality of movable means, means supporting said movable means for movement in a single plane and in a direction radially relative to the central portion of said plane, each of said movable means having a substantially V-shaped yielding body portion with a mounting portion intermediate the end portions thereof, with one end portion being engageable by the circuit operating means, and mechanical manually operated means common to all of said movable means for automatically and selectively moving movable means and having a part for engaging a selected movable means at the other end portion to move the selected movable means radially in said single plane.

HAROLD F. ELLIOTT.